US012263432B2

(12) United States Patent
Radon et al.

(10) Patent No.: US 12,263,432 B2
(45) Date of Patent: Apr. 1, 2025

(54) FILTER ASSEMBLY WITH SEDIMENTATION POCKET

(71) Applicant: PRATT & WHITNEY CANADA CORP., Longueuil (CA)

(72) Inventors: Joanna Radon, Rakszawa (PL); Rose Beaulieu, Verdun (CA); Pierre Gauvin, St-Bruno-de-Montarville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 537 days.

(21) Appl. No.: 17/644,925

(22) Filed: Dec. 17, 2021

(65) Prior Publication Data

US 2023/0191300 A1 Jun. 22, 2023

(51) Int. Cl.
*B01D 46/00* (2022.01)
*B01D 21/00* (2006.01)
*B01D 27/08* (2006.01)
*B01D 27/10* (2006.01)
(Continued)

(52) U.S. Cl.
CPC ........... *B01D 46/001* (2013.01); *B01D 29/90* (2013.01); *B01D 29/906* (2013.01); *B01D 46/0004* (2013.01); *B01D 46/0015* (2013.01); *B01D 46/0039* (2013.01); *B01D 46/023* (2013.01); *B01D 21/00* (2013.01); *B01D 27/08* (2013.01); *B01D 27/10* (2013.01); *B01D 27/103* (2013.01);
(Continued)

(58) Field of Classification Search
CPC .... B01D 46/001; B01D 29/90; B01D 29/906; B01D 46/0004; B01D 46/0015; B01D 46/0039; B01D 46/023; B01D 21/00; B01D 27/08; B01D 27/10; B01D 27/103; B01D 29/96; B01D 35/005; B01D 35/147; B01D 35/16

USPC ................................... 210/416.5, 532.1, 780
See application file for complete search history.

(56) References Cited

U.S. PATENT DOCUMENTS 1,780,663 A * 11/1930 Winslow ................ B01D 29/15
210/411
1,989,598 A * 1/1935 Kline ..................... B01D 27/08
236/12.17
(Continued)

FOREIGN PATENT DOCUMENTS

EP 0202071 A2 * 11/1986
WO WO-2008086328 A1 * 7/2008 ........... B01D 27/103
WO WO2022/212340 A1 10/2022

OTHER PUBLICATIONS

European Search Report issued in counterpart application 22214751.4 on Apr. 19, 2023.

*Primary Examiner* — Fred Prince
(74) *Attorney, Agent, or Firm* — NORTON ROSE FULBRIGHT CANADA LLP

(57) ABSTRACT

A filter assembly, has: a housing defining an internal volume and an outlet fluidly connectable to an oil system; a filter cartridge removably received within the internal volume of the housing; and an inlet conduit defining an inlet fluidly connectable to the oil system, the inlet conduit being in fluid flow communication with the internal volume of the housing, the inlet conduit having: a wall circumscribing a main flow passage from the inlet to the internal volume, and a sedimentation pocket defined by the wall, the sedimentation pocket extending downwardly away from the main flow passage and in a direction having a component parallel to a direction of a gravity when the filter assembly is in use.

18 Claims, 13 Drawing Sheets

(51) Int. Cl.
  *B01D 29/90* (2006.01)
  *B01D 29/96* (2006.01)
  *B01D 35/00* (2006.01)
  *B01D 35/14* (2006.01)
  *B01D 35/16* (2006.01)
  *B01D 46/02* (2006.01)
  *B01D 35/147* (2006.01)

(52) U.S. Cl.
  CPC ............ *B01D 29/96* (2013.01); *B01D 35/005* (2013.01); *B01D 35/147* (2013.01); *B01D 35/16* (2013.01)

(56) References Cited

U.S. PATENT DOCUMENTS

| | | | |
|---|---|---|---|
| 4,199,443 A | 4/1980 | Tauber | |
| 5,089,129 A | 2/1992 | Brigman | |
| 5,203,999 A * | 4/1993 | Hugues | B04B 1/02 210/512.3 |
| 5,558,058 A | 9/1996 | Ming et al. | |
| 6,261,455 B1 * | 7/2001 | Brown | B04B 1/06 494/68 |
| 7,178,987 B2 | 2/2007 | Bridges et al. | |
| 7,288,139 B1 | 10/2007 | Showalter | |
| 7,335,300 B1 | 2/2008 | Stamey, Jr. et al. | |
| 11,073,053 B2 | 7/2021 | Stachowiak | |
| 2003/0015465 A1 | 1/2003 | Fick et al. | |
| 2008/0099388 A1 | 5/2008 | Frost | |
| 2010/0270242 A1 | 10/2010 | Paradise | |
| 2013/0327690 A1 * | 12/2013 | Figura | B01D 29/23 210/133 |
| 2017/0340992 A1 | 11/2017 | Okamoto et al. | |
| 2024/0173653 A1 | 5/2024 | Shepherd | |

* cited by examiner

FIG_1

FIG_2

FIG_3

FIG_4

FIG_5

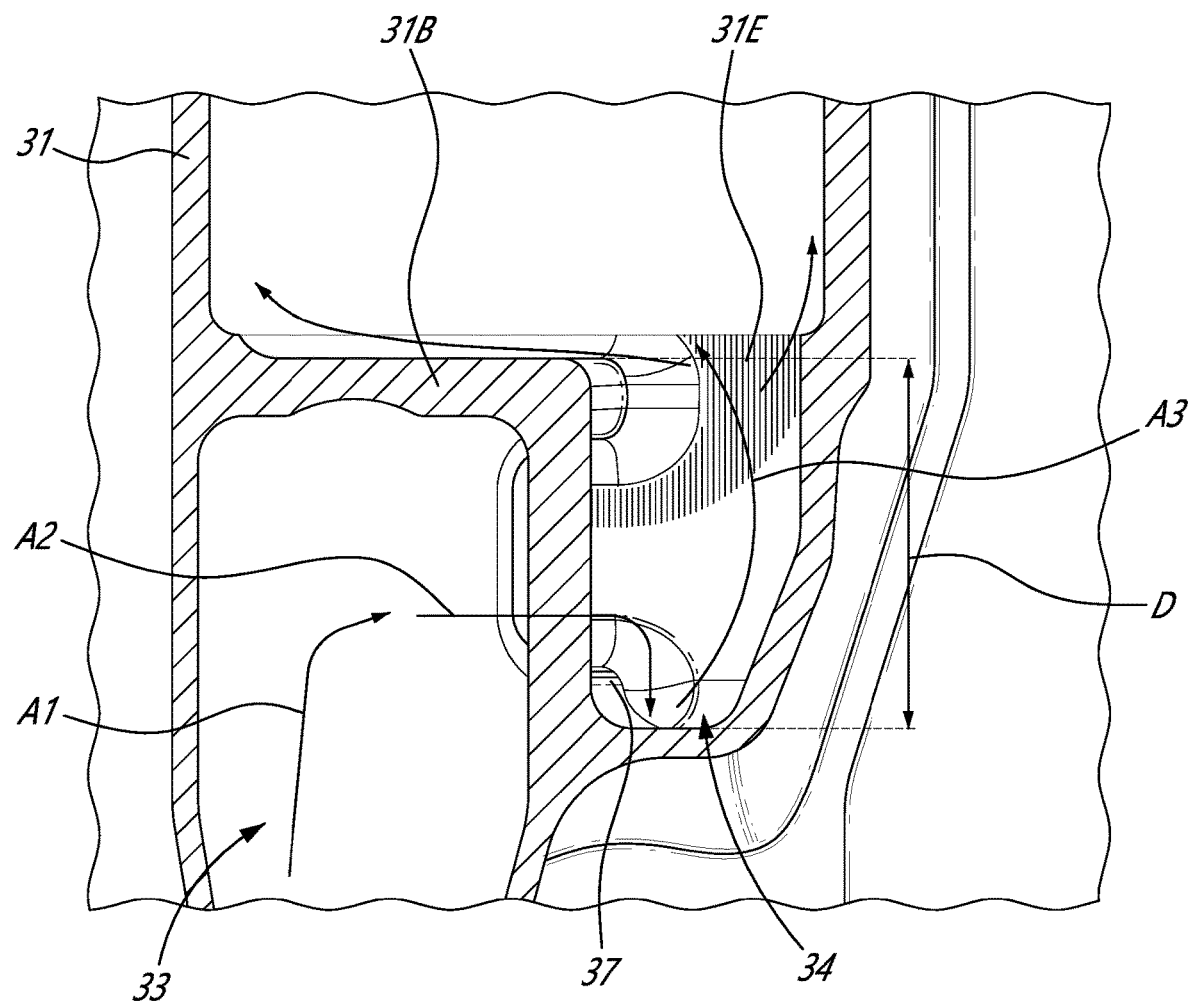
FIG_7

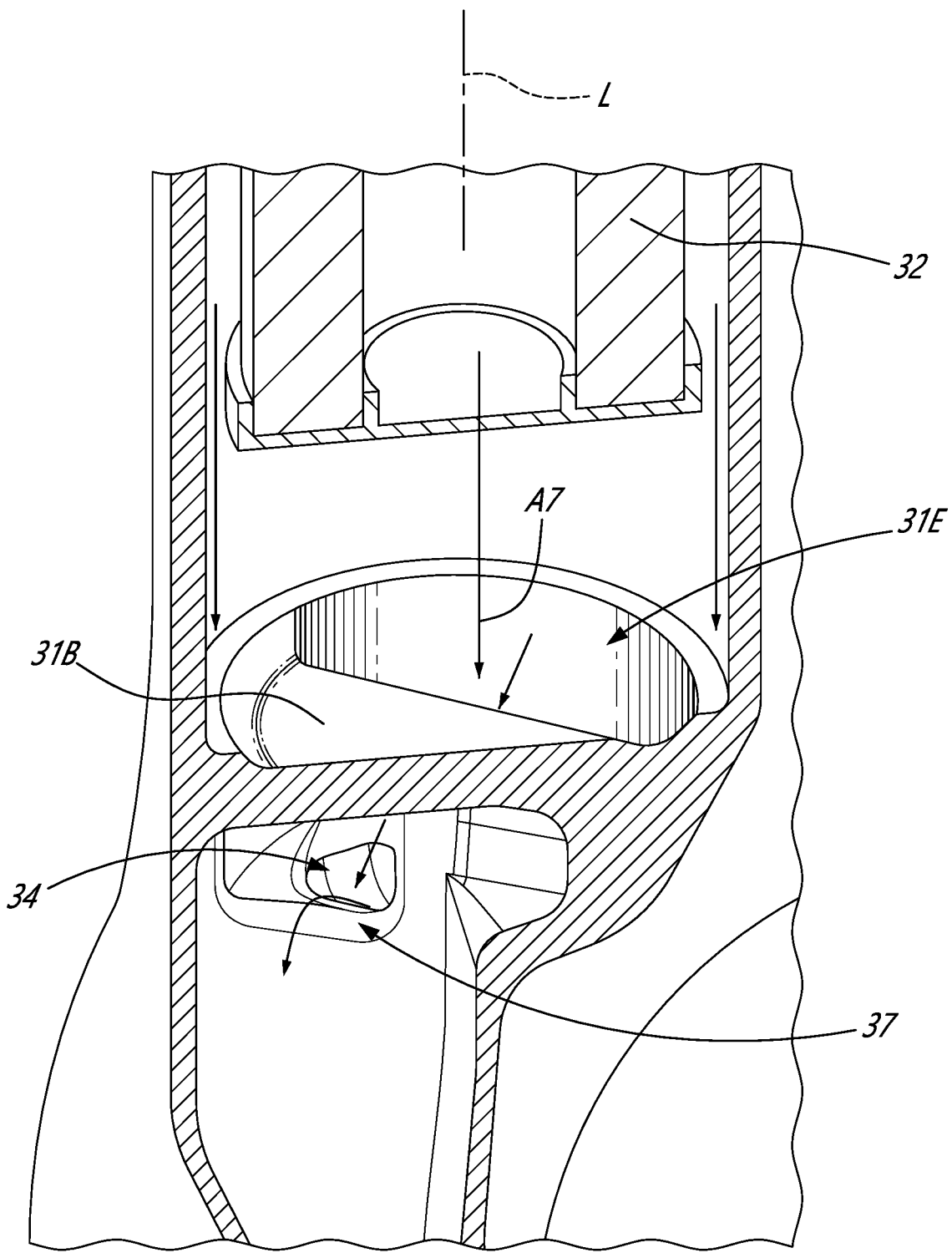
FIG_8

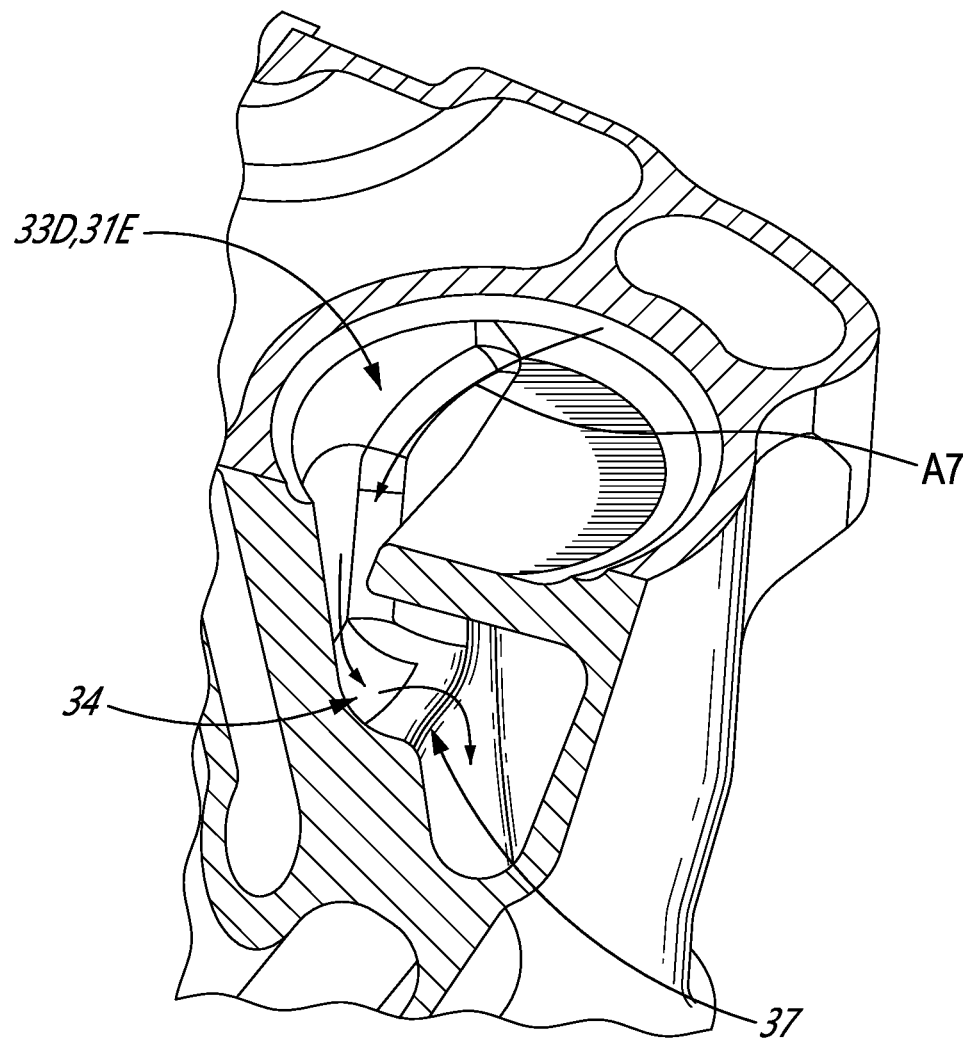
FIG_9

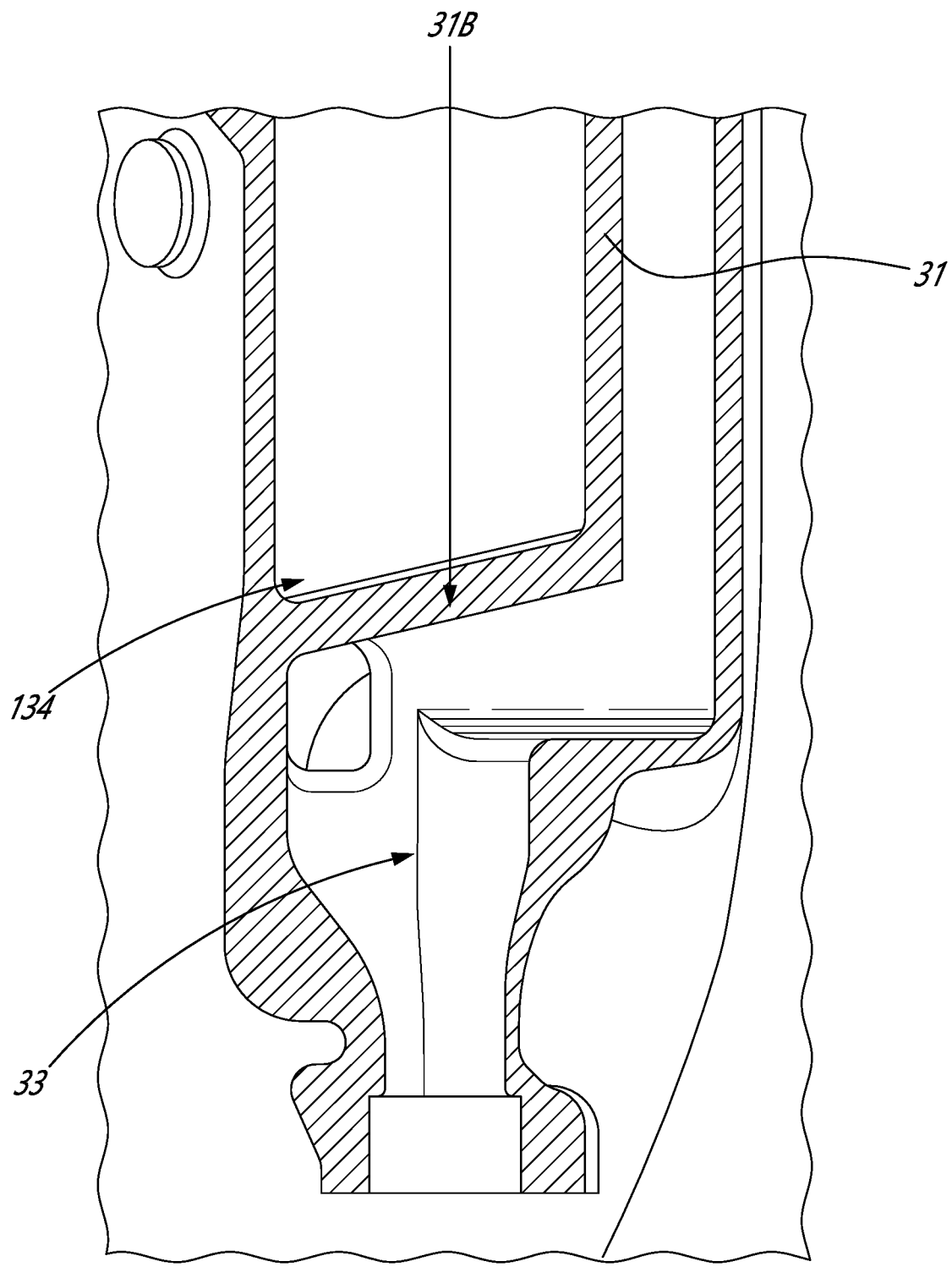
FIG_10

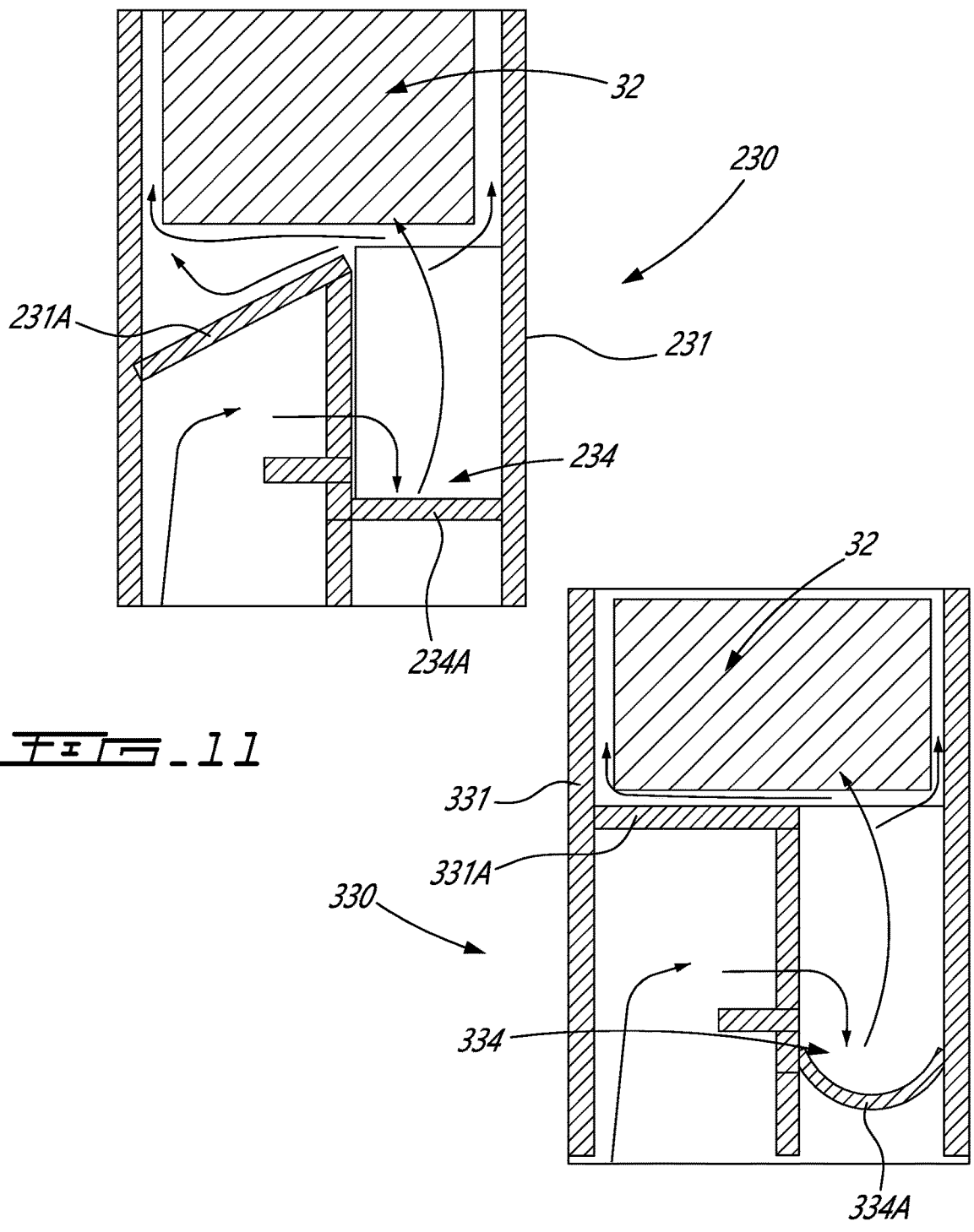

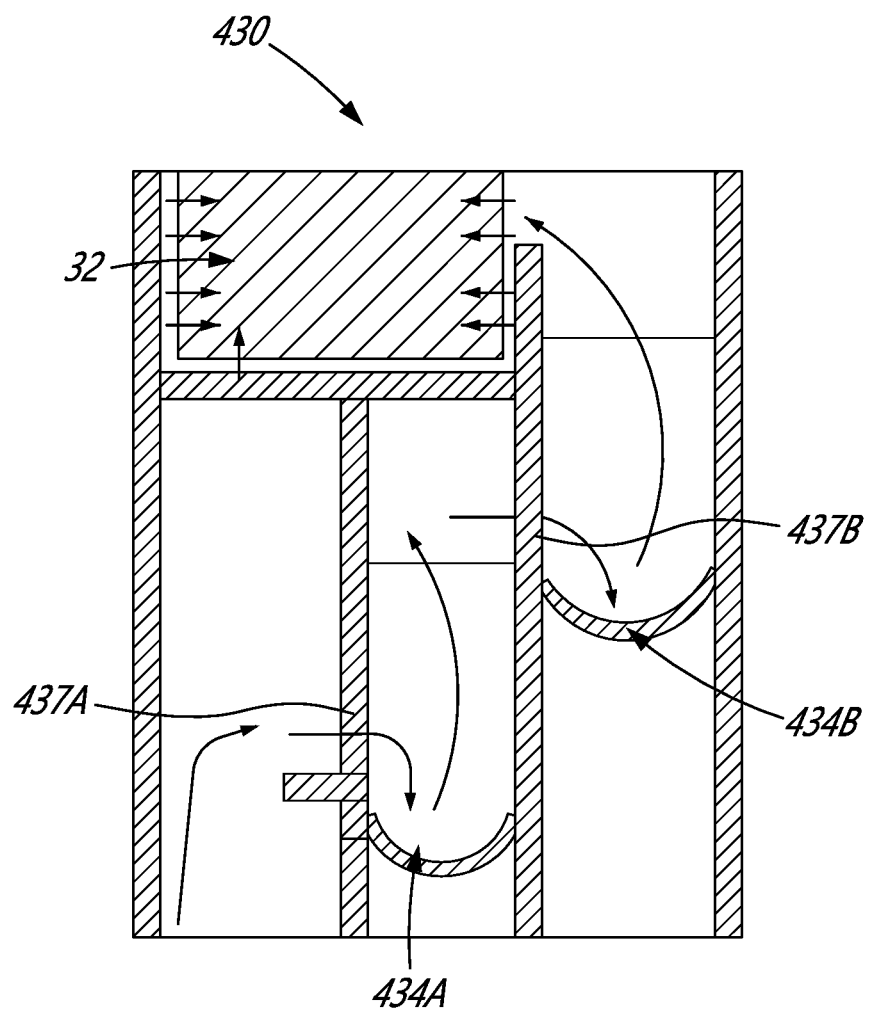

*1400*

```
┌─────────────────────────────────────────────────────────────┐
│  Direct the oil flow towards a filter cartridge via an inlet conduit  │
└─────────────────────────────────────────────────────────────┘
                                                            ⎫
                                                            ⎬ 1402
                                                            ⎭
                              ↓
┌─────────────────────────────────────────────────────────────┐
│  Flow the oil flow past a pocket defined by the inlet conduit │
│  thereby allowing a portion of particles in the oil flow to   │
│              sink by gravity in the pocket                    │
└─────────────────────────────────────────────────────────────┘
                                                            ⎫
                                                            ⎬ 1404
                                                            ⎭
                              ↓
┌─────────────────────────────────────────────────────────────┐
│           Flow the oil flow through the filter cartridge.     │
└─────────────────────────────────────────────────────────────┘
                                                            ⎫
                                                            ⎬ 1406
                                                            ⎭
```

FIG. 14

FILTER ASSEMBLY WITH SEDIMENTATION POCKET

TECHNICAL FIELD

The application relates generally to filters and, more particularly, to filters for filtering oil used to lubricate components such as gears and bearings.

BACKGROUND OF THE ART

Engines, such as gas turbine engines, use oil to distribute heat, lubricate rotating components, reduce friction, etc. This oil is circulated through the engine and can carry physical contaminants, such as carbon particles, metal particles, dirt, etc. Accordingly, scavenged oil is passed through a oil filtration unit comprising one or more filters in order to remove at least a portion of the contaminants from the oil before the oil is circulated back into the engine. The oil is filtered to avoid foreign objects damage (FOD) to components in need of lubrication.

SUMMARY

In one aspect, there is provided a filter assembly, comprising: a housing defining an internal volume and an outlet fluidly connectable to an oil system; a filter cartridge removably received within the internal volume of the housing; and an inlet conduit defining an inlet fluidly connectable to the oil system, the inlet conduit being in fluid flow communication with the internal volume of the housing, the inlet conduit having: a wall circumscribing a main flow passage from the inlet to the internal volume, and a sedimentation pocket defined by the wall, the sedimentation pocket extending downwardly away from the main flow passage and in a direction having a component parallel to a direction of a gravity when the filter assembly is in use.

The filter assembly may include any of the following features, in any combinations.

In some embodiments, the inlet conduit includes first and second sections being transverse to one another, the sedimentation pocket extending downwardly from an intersection between the first and second sections.

In some embodiments, the first section is secured to the housing, the sedimentation pocket being aligned with the first section.

In some embodiments, a flow passage area of the inlet conduit increases in a downstream direction from the inlet towards the sedimentation pocket.

In some embodiments, the flow passage area of the inlet conduit increases in the downstream direction away from the sedimentation pocket and toward the internal volume of the housing.

In some embodiments, the housing has a bottom wall, a top wall, and a peripheral wall extending along a longitudinal axis from the bottom wall to the top wall, the inlet conduit secured to the bottom wall.

In some embodiments, about half of the bottom wall is opened to communicate with the inlet conduit.

In some embodiments, the sedimentation pocket is in register with an aperture defined through the bottom wall.

In some embodiments, the sedimentation pocket is bounded by a lip, the lip extending into a flow passage area of the inlet conduit from the wall of the inlet conduit.

In some embodiments, the inlet conduit includes a third section extending from the second section, the third section extending substantially parallel to the first section.

In some embodiments, a flow passage area of the third section increases from the inlet to an intersection between the third section and the second section.

In some embodiments, the housing and the inlet conduit are parts of a monolithic single body.

In some embodiments, a bypass stems from the inlet conduit, the bypass fluidly connecting the inlet to the outlet of the filter assembly while bypassing the internal volume, and a bypass valve fluidly connected to the bypass conduit and operable to selectively allow or prevent fluid communication through the bypass.

In some embodiments, the inlet conduit includes first and second sections being transverse to one another, the sedimentation pocket extending downwardly from an intersection between the first and second sections, the first section secured to the housing, the bypass stemming from the second section.

In another aspect, there is provided a method of removing particles from an oil flow, comprising: directing the oil flow towards a filter cartridge via an inlet conduit; flowing the oil flow past a pocket defined by the inlet conduit thereby allowing a portion of particles in the oil flow to sink by gravity in the sedimentation pocket; and flowing the oil flow through the filter cartridge.

The method may include any of the following features, in any combinations.

In some embodiments, the directing of the oil flow includes decreasing a speed of the oil flow in the inlet conduit.

In some embodiments, the flowing of the flow past the sedimentation pocket includes flowing the flow in a first section of the inlet conduit and in a second section of the inlet conduit located downstream of the first section and being transverse to the first section, the sedimentation pocket located at an intersection between the first section and the second section.

In some embodiments, the method includes flowing the oil flow in a bypass upon a pressure differential across the filter cartridge exceeding a given threshold.

In some embodiments, the flowing of the oil flow in the bypass comprises flowing the oil flow in the bypass stemming from the inlet conduit upstream of the sedimentation pocket.

In some embodiments, the method includes retaining the particles in the sedimentation pocket with a lip extending upwardly from a wall of the inlet conduit.

DESCRIPTION OF THE DRAWINGS

Reference is now made to the accompanying figures in which:

FIG. 7 is an enlarged three dimensional cutaway view of the filter of FIG. 2 illustrating a sedimentation pocket thereof;

FIG. 8 is a top three dimensional cutaway view of the filter assembly of FIG. 2 illustrated with a filter cartridge being removed from a filter housing;

FIG. 9 is partial top three dimensional view of the filter of FIG. 2;

FIG. 10 is a cutaway view of a filter assembly in accordance with another embodiment;

FIG. 11 is a cutaway view of a filter assembly in accordance with another embodiment;

FIG. 12 is a cutaway view of a filter assembly in accordance with another embodiment;

FIG. 13 is a cutaway view of a filter assembly in accordance with another embodiment; and FIG. 14 is a flow chart illustrating steps of a method of filtering oil.

DETAILED DESCRIPTION

Figure 1:
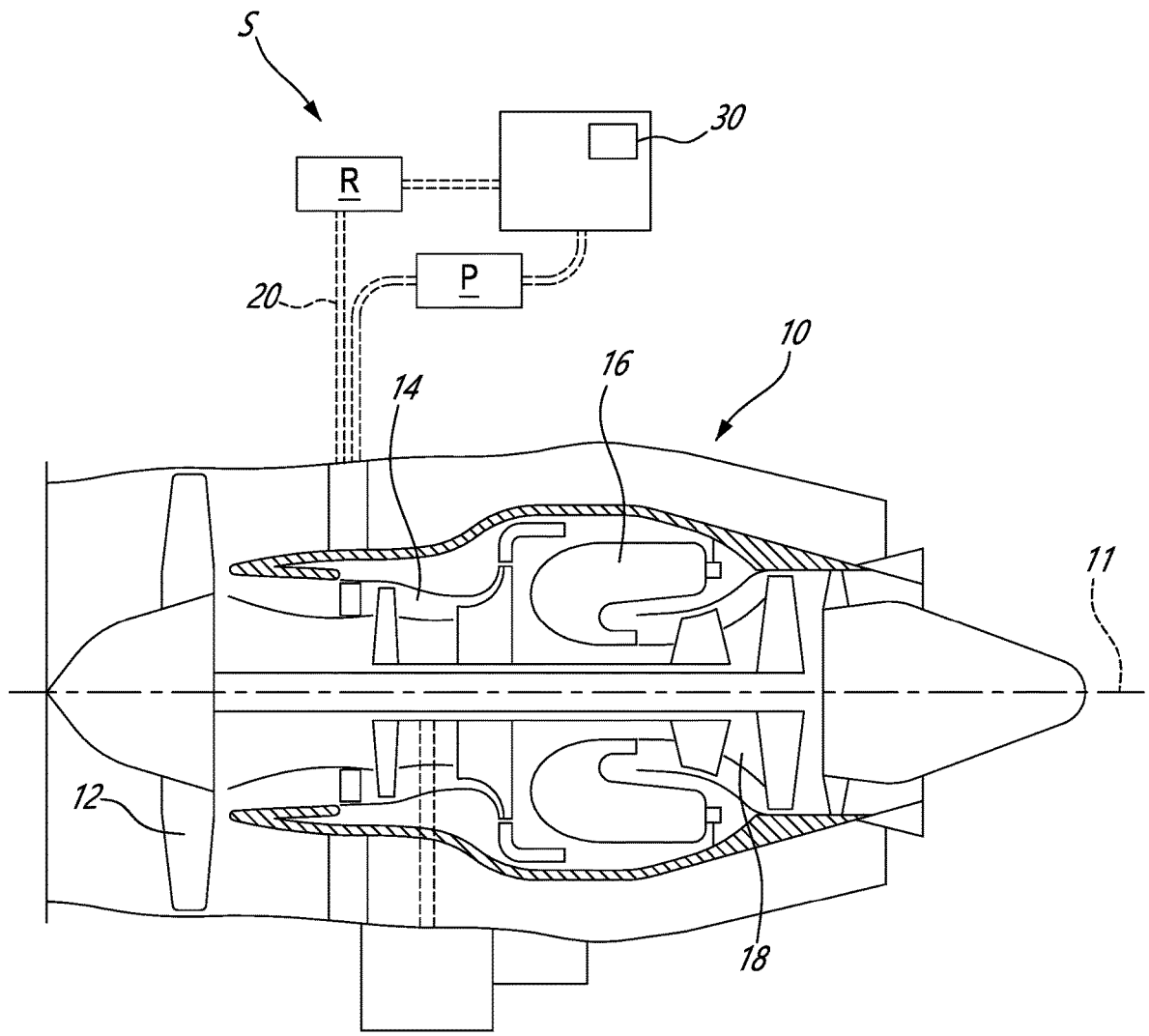
FIG. 1 is a schematic cross-sectional view of an aircraft engine exemplary depicted as a gas turbine engine.

FIG. 1 illustrates an aircraft engine depicted as a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, the compressor section 14, and the turbine section 18 are rotatable about a central axis 11 of the gas turbine engine 10.

The gas turbine engine 10 may include a lubrication system S that may include a pump P, lubrication conduits 20, an oil reservoir R, and a filter assembly 30. The lubrication system S may also include additional components such as valve(s) (not shown), heat exchangers, etc. The oil reservoir may be in fluid flow communication with one or more components of the gas turbine engine 10 in need of lubrication, such as, for instance, bearing cavity(ies), gearbox(es), and so on. The pump P induces a flow of the oil from the oil reservoir R and through the filter assembly 30, to the one or more components of the gas turbine engine 10 in need of lubrication, back from the one or more components toward the reservoir. The filter assembly 30 is used to remove contaminants from the oil before flowing the oil towards the one or more components. The filtration system and benefits described in present disclosure may apply also to other mechanism that requires lubrication and filtration system, like internal combustion engine, machining machines, mechanisms etc.

The oil filter cartridge may be a part of every engine oil system to ensure protection for the oil system elements (example jets, bearings, gears etc.) against Foreign Objects Damage (FOD). The main function is to clean up pressurized oil and flow the filtered oil back to the lubrication system S with predictable pressure drop. To prevent clogging, the filter cartridge may be periodically serviced during scheduled maintenance activity. It is desired to prevent debris, already collected by the filter, getting back to the oil system S during maintenance. Also, if the filter gets clogged, the oil system S may have to be supplied by non-filtered oil with possibly reduced number of debris. The filter can also be bypassed when the pressure drop through it is high due to another phenomena like high viscosity (cold oil).

In some configurations, an oil filter assembly, which includes the filter cartridge and a housing containing the filter cartridge, is secured to the gas turbine engine 10 in such a way that replacement of the filter cartridge includes pulling the whole filter assembly downward or another position (ex. side location). However, in some other configurations, the location of the oil filter assembly is such that there is no room to allow the oil filter cartridge to be moved downwardly and must be changed from a top. Moreover, care should be taken to ensure that there are no debris that falls into a clean oil outlet of the filter assembly when changing the filter cartridge. There is disclosed herein a filter assembly that may alleviate at least some of the aforementioned problems. Furthermore, a typical filter assembly include a bypass that allow oil to flow directly from the inlet of the filter assembly 30 to its outlet without flowing through the filter cartridge. This may ensure that oil continues to flow to the different components even if said the pressure drop across the filter is high. The filter assembly 30 of the present disclosure may provide a pre-filtering stage that may extend the lifespan of the filter cartridge and may reduce occurrences in which unfiltered oil flows in the bypass.

Figure 2:
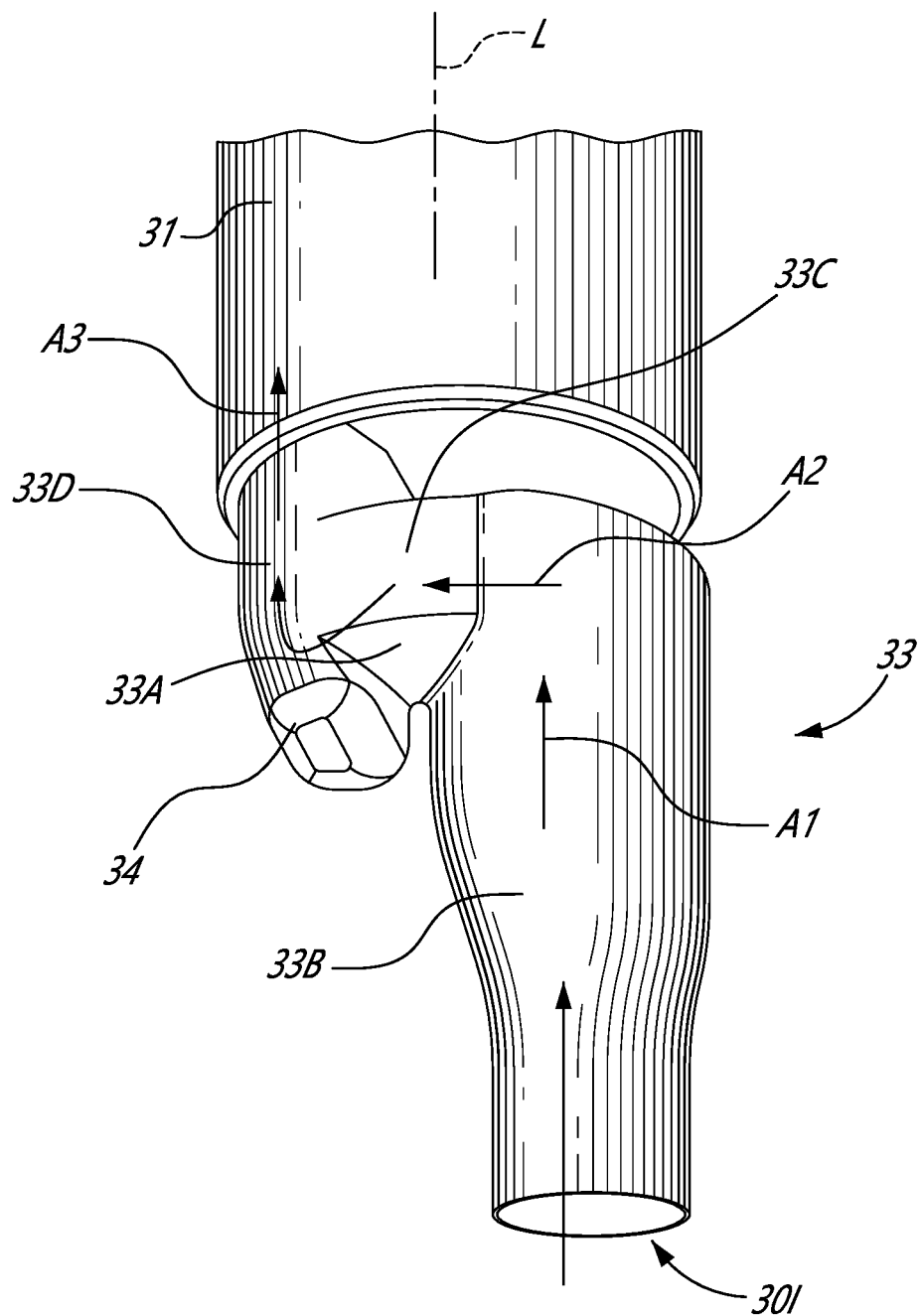
FIG. 2 is a bottom three dimensional view of a filter assembly of an oil system of the aircraft engine of FIG. 1.
Figure 3:
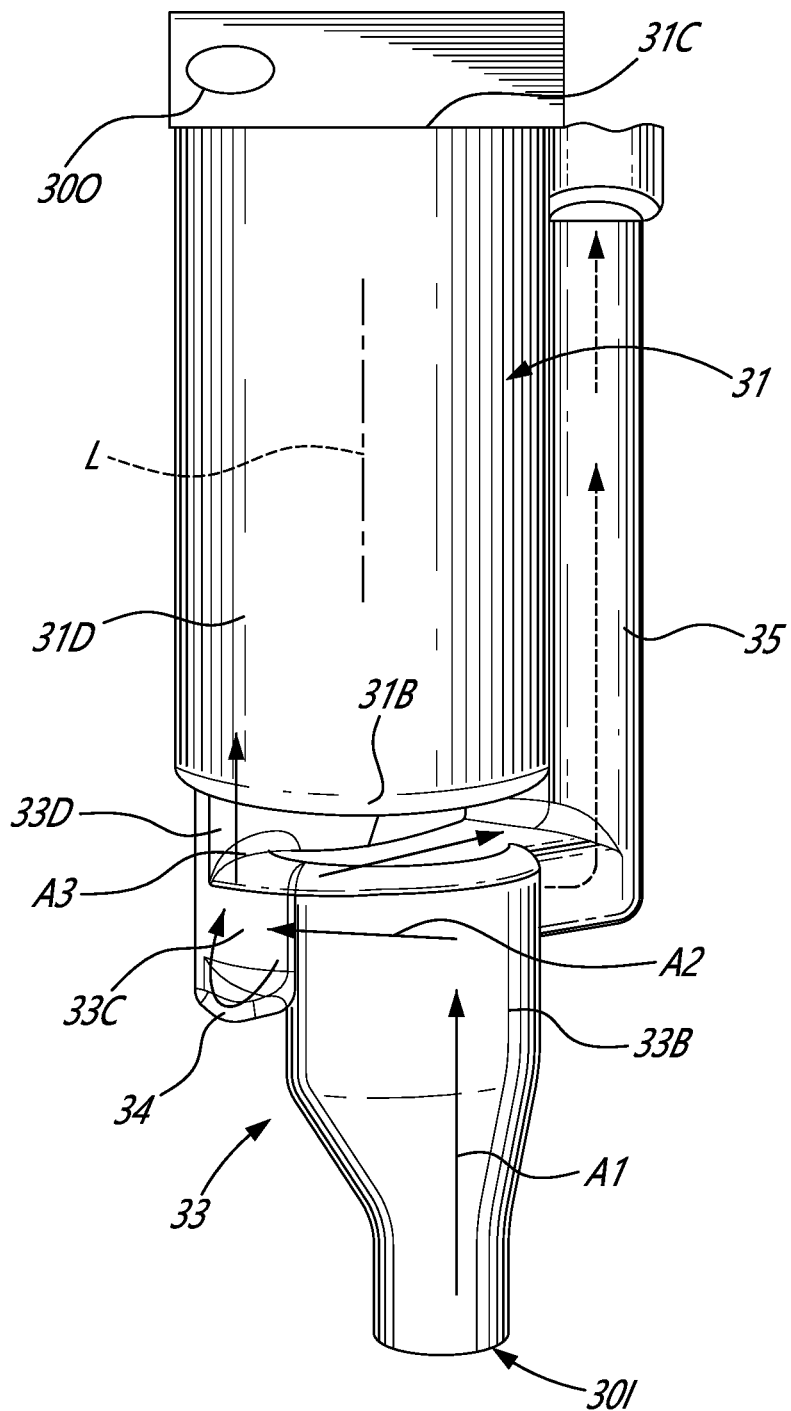
FIG. 3 is a front three dimensional view of the filter assembly of FIG. 2.
Figure 4:
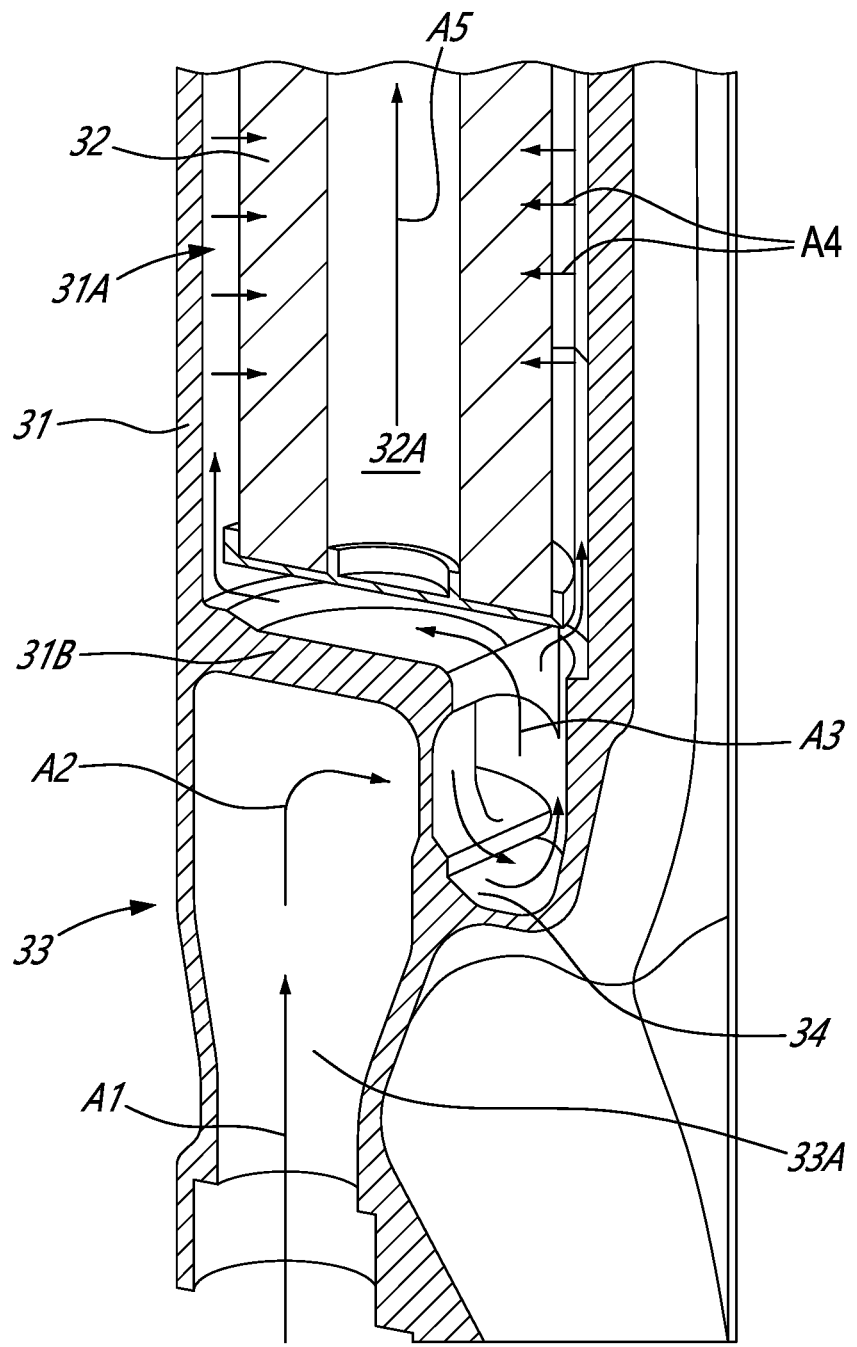
FIG. 4 is a three dimensional cutaway view of the filter assembly of FIG. 2.

Referring to FIGS. 2-4, the filter assembly 30 includes an inlet 30I and an outlet 30O (FIG. 3). More detailed description of the outlet 30O of the filter assembly 30, and of a filter cover thereof, is presented in U.S. patent application Ser. No. 16/778,443 filed on Jan. 30, 2020, the entire contents of which are incorporated herein by reference. The inlet 30I and the outlet 30O are hydraulically connected to the oil system S of the gas turbine engine 10.

The filter assembly 30 includes a housing 31, which may be referred to as filter bowl. The housing 31 defines an internal volume 31A (FIG. 4) that is sized to accommodate a filter cartridge 32. The housing 31 extends along a longitudinal axis L. The housing 31 includes a bottom wall 31B, a top wall 31C, and a peripheral wall 31D that extends from the bottom wall 31B to the top wall 31C and that extends circumferentially around the longitudinal axis L. Herein, the expressions "bottom" and "top" refer to actual positions of the filter assembly 30 when mounted to the gas turbine engine 10. Hence, when installed, an elevation relative to a ground of the top wall 31C is greater than that of the bottom wall 31B. In the embodiment shown, the housing 31 defines an aperture 31E (FIG. 8) that creates an inlet of the internal volume 31A. The aperture 31E may be defined through the bottom wall 31B. It will however be appreciated that the aperture 31E may be alternatively be defined through the top wall 31C or the peripheral wall 31D without departing from the scope of the present disclosure. Also, other shapes of the housing 31 are contemplated.

In the embodiment shown, the filter assembly 30 includes an inlet conduit 33 that hydraulically connects the inlet 30I to the aperture 31E of the housing 31 such that the inlet conduit 33 defines the inlet 30I of the filter assembly 30 and is in fluid flow communication with the internal volume 31A via the aperture 30E. The inlet conduit 33 may provide a pre-filtering stage to the filter cartridge 32 as will be explained below. The inlet conduit 33 may be secured to the bottom wall 31B of the housing 31.

The filter assembly 30 includes a sedimentation pocket 34 that is in fluid communication with the inlet conduit 33. The sedimentation pocket 34 is located upstream of the internal volume 31A of the housing 31 and downstream of the inlet 30I relative to a flow of oil received via the inlet 30I. The sedimentation pocket 34 is defined by a wall 33A of the inlet conduit 33. The wall 33A circumscribes a main flow passage from the inlet 30I to the internal volume 31A. The sedimentation pocket 34 extends downwardly away from the main flow passage defined by the inlet conduit 33 from the inlet 30I to the internal volume 31A when the filter assembly is in use. Put differently, the sedimentation pocket 34 extends from the main flow passage in a direction having a component parallel to a direction of the gravity when the filter assembly 30 is in use and installed on the gas turbine engine 10. The sedimentation pocket 34 may extend in a direction being generally transverse to the main flow passage. The sedimentation pocket 34 may correspond to a bulge defined by the inlet conduit 33. The sedimentation pocket 34 may define a close-ended cavity in the inlet conduit 33.

In the depicted embodiment, the inlet conduit 33 includes a first section 33B, a second section 33C extending transversally from the first section 33B and a third section 33D extending transversally from the second section 33C. The first, second, and third sections 33B, 33C, 33D may provide a "Z" shape to the inlet conduit 33. The sedimentation pocket 34 may be located at an intersection between the second section 33C and the third section 33D and extends downwardly from the intersection between the second section 33C and the third section 33D. Herein, the expression "extending downwardly" means extending towards a ground when the filter assembly 30 is installed in the gas turbine engine 10. A bottom of the sedimentation pocket 34 is therefore at a lower elevation relative to the ground than an inlet of the sedimentation pocket 34 such that the oil flow may enter the sedimentation pocket 34 by gravity. The particles may therefore separate from a flow of the oil flowing towards the internal volume by sedimentation, which is a process in which particles separates from a fluid by gravity.

Referring more particularly to FIG. 2, in the present embodiment, the oil flows upwardly along first arrow A1 within the first section 33B, changes direction to flow along second arrow A2 within the second section 33C, and changes direction again to flow along third arrow A3 within the third section 33D via which the oil enters the internal volume 31A of the housing 31. In the present embodiment, the first and third arrows A1, A3 may be substantially parallel to the longitudinal axis L of the housing 31. The second arrow A2 may be substantially normal to the longitudinal axis L. Hence, the inlet conduit 33 may define two elbows where the flow changes direction by about 90 degrees. It will be appreciated that other angles are contemplated.

The first section 33B of the inlet conduit 33 may define an increase of a flow circulating area in a downstream direction from the inlet 30I. In other words, a cross-sectional area of the first section 33B taken on a plane normal to a direction of the flow within the first section 33B may increase from the inlet 30I towards an intersection between the first and second sections 33B, 33C of the inlet conduit 33. This increase in flow circulating area of the first section 33B of the inlet conduit 33 may decrease a speed at which the oil flows within the first section 33B.

The oil then enters the second section 33C. A flow circulating area of the second section 33C may increase from the intersection with the first section 33B to the intersection with the third section 33D. At which point, the oil reaches the intersection between the second and third sections 33C, 33D. Then, the flow of oil has to turn upwardly to flow in the third section 33D and to reach the internal volume 31A of the housing 31. This sudden change of direction may be such that heavier particles in suspension within the flow of oil may not be able to negotiate the turn and falls by gravity into the sedimentation pocket 34 where they may become trapped. Hence, these heavier particles may remain in the sedimentation pocket 34 and may not reach the filter cartridge 32. This may contribute in increasing the lifespan of the filter cartridge 32 because those heavier and bigger particles are less susceptible to reach the filter cartridge 32.

As shown in FIGS. 3 and 9, a flow circulating area of the third section 33D of the inlet conduit 33 increases in the downstream direction from the intersection with the second section 33C toward the aperture 31E that leads to the internal volume 31A of the housing 31. This increase in flow circulating area may further decrease the speed at which the oil travels toward the filter cartridge 32 and may cause the heavier particles to fall by gravity into the sedimentation pocket 34.

As shown in FIG. 4, once the oil enters the internal volume 31A of the housing 31 it flows radially inwardly relative to the longitudinal axis L across the filter cartridge 32 along fourth arrows A4 and reaches a central passage 32A of the filter cartridge 32 and flows longitudinally along fifth arrow A5 toward the outlet 30O of the filter assembly 30.

Figure 5:
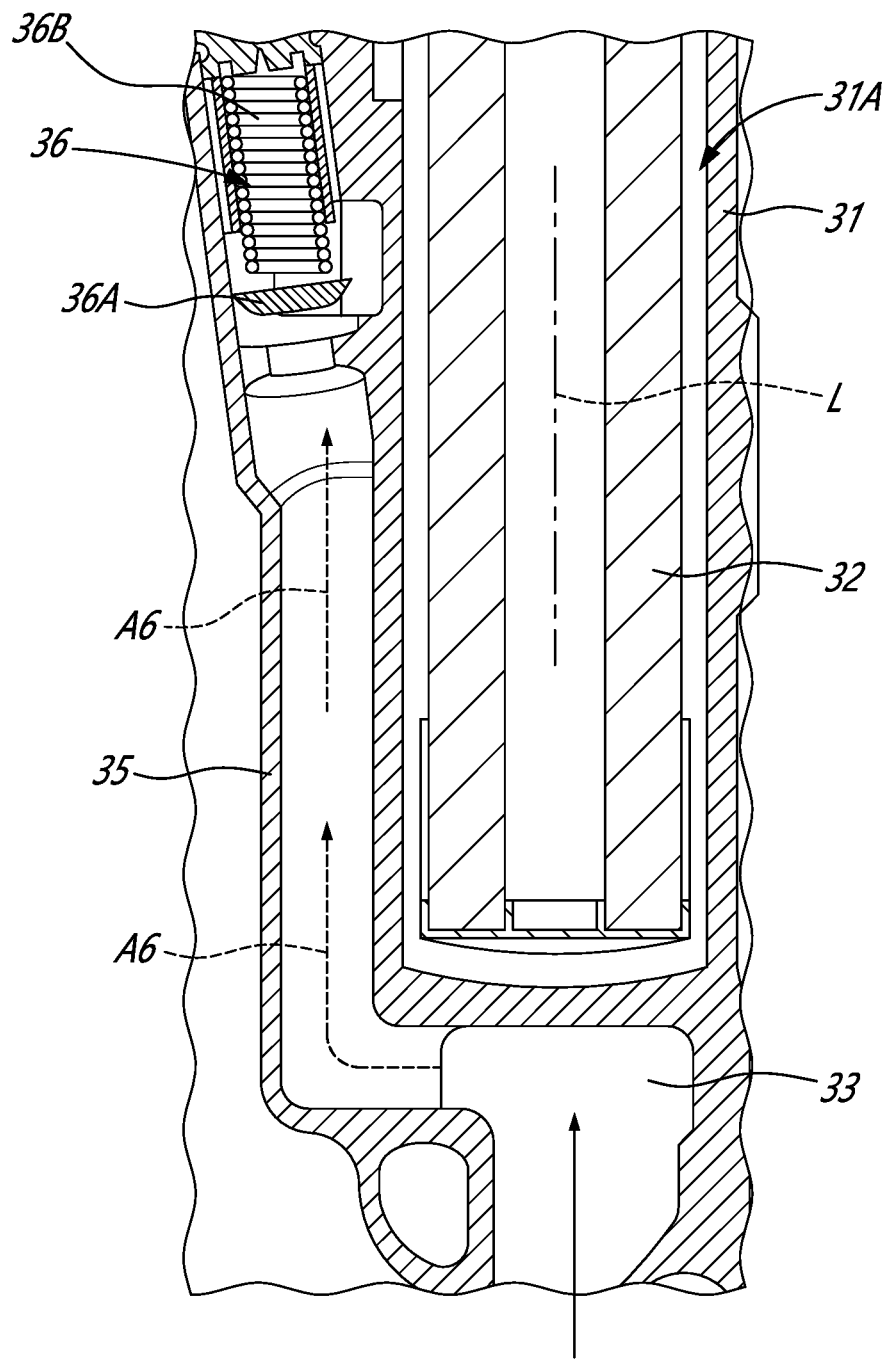
FIG. 5 is a cutaway view of the filter assembly of FIG. 2.

Referring now to FIGS. 3 and 5, in the embodiment shown, the filter assembly 30 includes a bypass 35. The bypass 35 may stem from the inlet conduit 33 and fluidly connects the inlet 30I to the outlet 30O of the filter assembly 30 while bypassing the internal volume 31A of the housing 31. The bypass 35 is used to allow a flow of oil to bypass the filter cartridge 32 in an event where said cartridge is clogged or is in a condition of high resistance to the oil flow. As shown in FIG. 3, the bypass 35 stems from the second section 33C of the inlet conduit 33 at a location that is downstream of the inlet 30I and upstream of the sedimentation pocket 34. It will be however appreciated that the bypass 35 may alternatively stem from any suitable locations such as, for instance, from the third section 33D of the inlet conduit 33 and downstream of the sedimentation pocket 34. In some embodiments, the oil flows past the sedimentation pocket 34 before reaching the bypass 35. The sedimentation pocket 34 may allow the removal of the heavier particles from the oil before the oil flows in the bypass 35 to be circulated in the oil system S. The sedimentation pocket 34 may therefore offer a pre-filtering stage before the oil flows to either the bypass 35 or through the filter cartridge.

A bypass valve 36 is fluidly connected to the bypass 35 and is operable to selectively allow or prevent fluid communication through the bypass 35. In other words, the bypass valve 36 has an open configuration in which oil flows from the inlet 30I to the outlet 30O via the bypass 35 and through the bypass valve 36 while bypassing the internal volume 31A of the housing 31 and a closed configuration in which fluid communication between the inlet 30I and the outlet 30O via the bypass 35 is prevented by the bypass valve 36. It will be appreciated that an outlet of the bypass 35 may be fluidly connected to the lubrication system S independently of the outlet 30O of the filter assembly 30. In other words, the filter assembly may have two outlets: the outlet 30O and a bypass outlet being different than the outlet 30O.

The bypass valve 36 may be a pressure-based valve comprising a member 36A that moves from a first position corresponding to the closed configuration of the bypass valve 36 to a second position corresponding to the open configuration of the bypass valve 36. The member 36A may be engaged by a biasing member 36B, such as a spring, to bias the member 36A in sealing engagement against a seat to prevent fluid communication through the bypass valve 36 in the closed configuration. The bypass valve 36 may be a passive device that automatically opens communication through the bypass 35 or an actuated device that opens communication through the bypass 35 upon reception of a signal from a controller of the gas turbine engine 10. Any suitable valve may be used without departing from the scope of the present disclosure. In the open configuration, the oil then flows along a sixth arrow A6 in the bypass 35.

Figure 6:
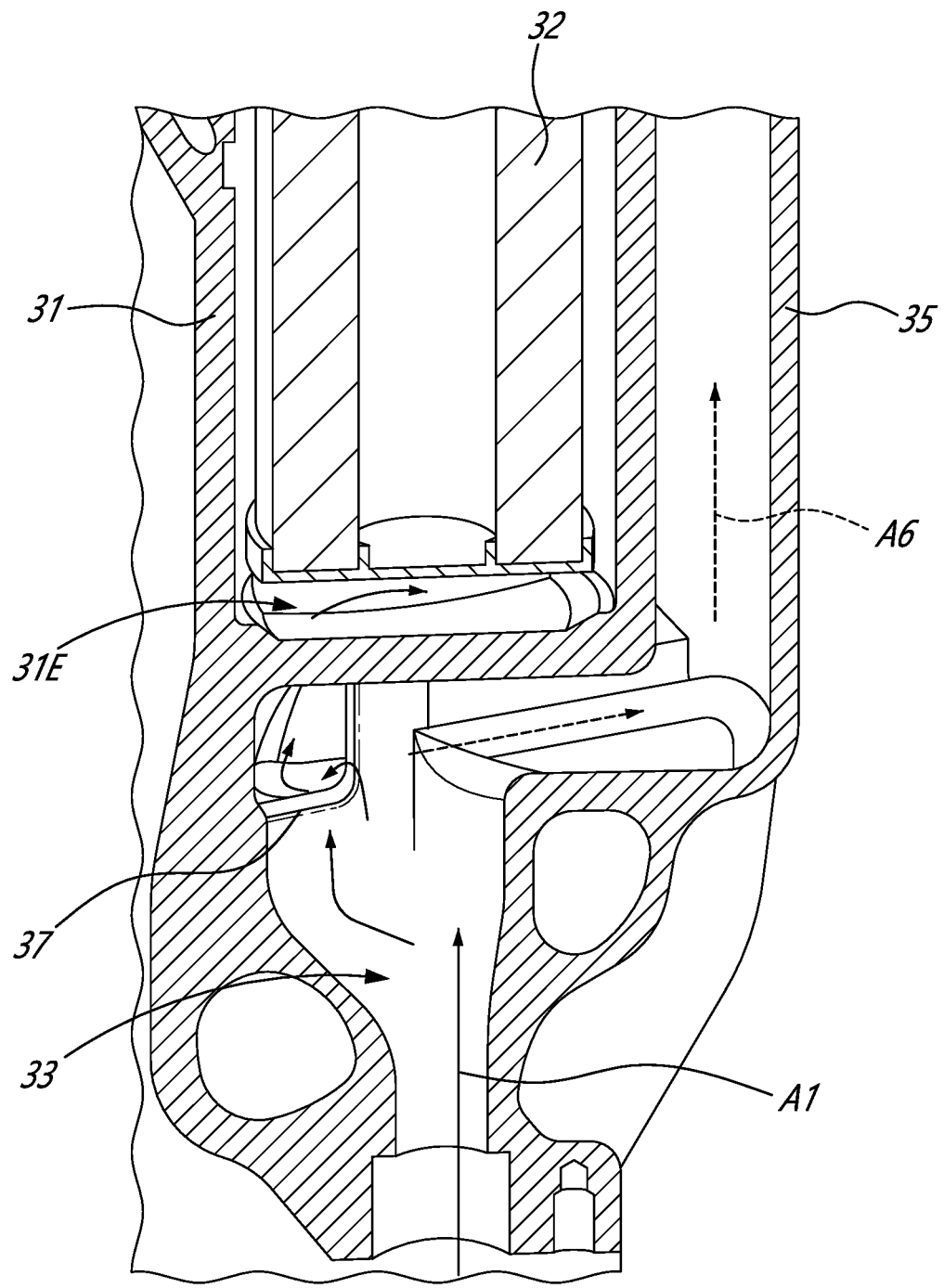
FIG. 6 is another three dimensional cutaway view of the filter assembly of FIG. 2.

Referring to FIGS. 6-7, in the embodiment shown, a lip 37 is provided at the intersection between the second and third sections 33C, 33D of the inlet conduit 33. The lip 37 extends upwardly and protrudes into a flow passage area of the inlet conduit 33. The lip 37 may act as a dam to define a pool in which the heavy particles may remain trapped as explained above. The lip 37 may retain contaminants from the internal volume 31A (occurred at engine shut down or filter removal)—in that condition the lip 37 may retain the contaminants in the pocket. A height of the lip 37 defines a depth of the sedimentation pocket 34. The depth of the sedimentation pocket 34 may be adjusted such that a distance D taken along the longitudinal axis L and from a bottom of the sedimentation pocket 34 to the aperture 31E defined through the bottom wall 31B of the housing 31 is optimized for adequately capturing the particles in suspension in the oil. The depth of the sedimentation pocket 34 may be determined as a function of oil pressure and other parameters such as the quantity of sediments that may be collected.

The lip 37 may create a sudden expansion of the flow circulating area. This may further cause a decrease in the speed at which the oil flows in the inlet conduit 33, which may further help in allowing the heavier particles to sink downwardly and fall into the sedimentation pocket 34. Moreover, this effect may be compounded by the fact that the oil has to flow upwardly, against the gravity, to reach the internal volume 31A of the housing 31. This may further limit the quantity of particles that reaches the internal volume 31A since they may be prone to fall and stay in the sedimentation pocket 34 by gravity and/or because of this slowing down of the oil flow. Moreover, the lip 37 may isolate the particles already in the sedimentation pocket 34 and may prevent the flow of oil from entraining the particles out of the sedimentation pocket 34.

Referring now to FIGS. 8-9, in the present embodiment, the aperture 31E through the bottom wall 31B is in register with the sedimentation pocket 34. A surface of the aperture 31E may be about half of a surface of the bottom wall 31B. The surface of the aperture 31E may be any percentage of surface bottom wall 31B considering oil flow, pressure, acceptable pressure decreasing before oil reach the filter cartridge and other parameters. The expression "about" may include variations of plus or minus 10%. The third section 33D of the inlet conduit 33 may flare open from the intersection with the second section 33C of the inlet conduit 33 to the aperture 31E. When replacing the filter cartridge 32, a maintenance technician moves the filter cartridge 32 upwardly along the longitudinal axis L and away from the bottom wall 31B of the housing 31. When the filter cartridge 32 is removed from the internal volume 31A of the housing 31, the maintenance technician may look in the internal volume 31A and see the sedimentation pocket 34 thanks to the aperture 31E being in register with the sedimentation pocket 34. The maintenance technician may then evaluate a quantity and sizes of particles trapped in the sedimentation pocket 34. These particles may be removed from the sedimentation pocket 34. Data about these particles in the sedimentation pocket 34 may allow the maintenance technician to diagnose further issues. For instance, the presence of big carbon particles may be indicative of excessive wear on a carbon seal of a bearing cavity containing one or more bearings of the gas turbine engine 10.

Still referring to FIGS. 8-9, when replacing the filter cartridge 32, it is expected that oil and particles will flow out of the filter cartridge 32 and flow downwardly along seventh arrow A7 toward the bottom wall 31B and the aperture 31E therethrough. This may also be useful after engine shut down, when pressured oil is not delivered any more and residual oil from filter cartridge drops down by gravity. In the present embodiment, these particles may fall in the sedimentation pocket 34, which is located in register with the aperture 31E. Moreover, the converging shape of the third section 33D of the inlet conduit 33 may guide the particles towards the sedimentation pocket 34. The lip 37 may assist in maintaining the particles inside the sedimentation pocket 34. As the oil flows from the filter cartridge 32 toward the aperture 31E, the particles should fall into the sedimentation pocket 34. The lip 37 may prevent these particles from being entrained by the oil flowing from the filter cartridge 32 and may prevent these particles from flowing further toward the inlet 30I of the filter assembly 30. In other words, the lip 37 may act as a dam to maintain the particles in the sedimentation pocket 34 while the oil flows downwardly toward the inlet 30I of the filter assembly 30 during cartridge replacement. Therefore, because of the sedimentation pocket 34 and the lip 37, the particles may remain in the sedimentation pocket 34 once the filter cartridge 32 is replaced and when the oil system S is back in operation. In other words, once the gas turbine engine 10 is re-started, the oil that starts to flow in the oil system S flows through the filter assembly 30 and the particles may remain in the sedimentation pocket 34. The sedimentation pocket 34 may therefore avoid these particles from reaching the filter cartridge 32 once the gas turbine engine is back in operation. If the sedimentation pocket 34 were absent, the particles that fell from the used filter cartridge may reach the inlet 30I and may be eventually entrained by the oil flow back toward the new filter cartridge, which may be undesired. It may also prevent the sediments to go towards the bypass passage, and the engine, if the filter is being bypassed.

In the embodiment shown, the housing 31, the inlet conduit 33, and the bypass 35 are all parts of a monolithic body of the filter assembly 30. The internal volume 31A and the bypass 35 may be cavities defined by this monolithic body. In some embodiments, the housing 31 may be monolithic with the reservoir R (FIG. 1) that contains the oil that flows in the oil system S (FIG. 1).

Other limitations may complicate the installation of the filter assembly 30 in the gas turbine engine 10. In some embodiments, the filter assembly 30 may be longer compared to similar size engines. The housing 31 may be integral as part of a cast part. This may prevent the removal of the filter cartridge 32 with the housing 31 altogether. Due to space constrains, it may alternatively be separate. As discussed above, the filter assembly 30 may be aligned vertically, with the longitudinal axis L being substantially normal to a ground.

The disclosed filter assembly 30 with the sedimentation pocket 34 may partially protect the filter cartridge 32 against particles. This may allow for more freedom when positioning and locating the filter assembly 30 and may allow separate cores for normal and bypass condition.

Referring now to FIG. 10, another embodiment of a filter assembly is shown. For the sake of conciseness, only elements differing from the filter assembly 30 described above with reference to FIGS. 1-9 are described below. In the embodiment shown, the bottom wall 31B of the housing 31 is sloped. This may create a secondary sedimentation pocket 134 that may trap particles as explained herein above.

Referring now to FIG. 11, another embodiment of a filter assembly is shown at 230. For the sake of conciseness, only elements differing from the filter assembly 30 described above with reference to FIGS. 1-9 are described below.

In the embodiment shown, the sedimentation pocket 234 has a bottom wall 234A that is substantially flat and the bottom wall 231A of the housing 231 is sloped. The combination of the sedimentation pocket 234 and of the slopped bottom wall 231A may provide two locations for heavy particles to be captured during use of the filter assembly 230. In the present case, the bottom wall 231A of the housing 231 slopes downwardly and away from the sedimentation pocket 234.

Referring now to FIG. 12, another embodiment of a filter assembly is shown at 330. For the sake of conciseness, only elements differing from the filter assembly 30 described above with reference to FIGS. 1-9 are described below. In the embodiment shown, the sedimentation pocket 334 has a bottom wall 334A that is curved and the bottom wall 331A of the housing 331 is substantially perpendicular to the longitudinal axis L.

Referring now to FIG. 13, another embodiment of a filter assembly is shown at 430. For the sake of conciseness, only elements differing from the filter assembly 30 described above with reference to FIGS. 1-9 are described below.

In the embodiment shown, the filter assembly 30 includes a cascade of sedimentation pockets, which includes two sedimentation pockets 434A, 434B. Each of those two sedimentation pockets 434A, 434B is bounded by a respective lips 437A, 437B used to maintain the particles in the two sedimentation pockets 434A, 434B as explained above. An elevation of the second sedimentation pocket 434B is greater than that of the first sedimentation pocket 434A. Therefore, when the oil flows in the first sedimentation pocket 434A, a portion of the particles may sink towards a bottom of the first sedimentation pocket 434A. Then, a level of oil increases until it reaches an opening via which it may flow in the second sedimentation pocket 434B where another portion of the particles may sink towards a bottom of the second sedimentation pocket 434B. When replacing the filter cartridge 32, the oil and particles that fall downward may be trapped by the second sedimentation pocket 434B and the second lip 437B. Particles that manage to flow past the second lip 437B may be trapped in the first sedimentation pocket 434A and the first lip 437B. Any suitable number of sedimentation pockets is contemplated. For instance, more than two sedimentation pockets may be used.

Referring now to FIG. 14, a method of removing particles from the oil flow is shown at 1400. The method 1400 includes directing the oil flow towards the filter cartridge 32 via the inlet conduit 33 at 1402; flowing the oil flow past the sedimentation pocket 34 defined by the inlet conduit 33 thereby allowing a portion of particles in the oil flow to sink by gravity in the sedimentation pocket 34 at 1404; and flowing the oil flow through the filter cartridge 32 at 1406.

In the present embodiment, the directing of the oil flow at 1402 includes decreasing a speed of the oil flow in the inlet conduit 33. As explained above, this may be done by having a flow passage area of the inlet conduit 33 increases in a downstream direction from the inlet 30I to the internal volume 31A of the filter housing 31.

The flowing of the flow past the sedimentation pocket 34 may include flowing the flow in the second section 33C of the inlet conduit 33 and in the third section 33D of the inlet conduit 33 located downstream of the second section 33C and being transverse to the second section 33C; the sedimentation pocket 34 located at the intersection between the second section 33C and the third section 33D.

In some cases, the filter cartridge 32 may become clogged, for instance due to contamination or another phenomena like high oil viscosity at cold condition being flow down through the filter, such that a pressure differential across said filter cartridge 32 exceeds a given threshold. In such instance, the method 1400 may include flowing the oil flow in the bypass 35 upon the pressure differential across the filter cartridge 32 exceeding the given threshold. The flowing of the oil flow in the bypass 35 may comprise flowing the oil flow in the bypass 35 stemming from the inlet conduit 33 upstream of the sedimentation pocket 34.

The method 1400 may include retaining the particles in the sedimentation pocket 34 with the lip 37 extending upwardly from the wall 33 of the inlet conduit 33. As explained above, this may be useful when the filter cartridge 32 is being replaced and particles and oils falls down toward the inlet 30I of the filter assembly 30. Same functionality may be utilized after engine shut down, when pressured oil is not delivered any more and residual oil from filter cartridge drops down by gravity.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A filter assembly, comprising:
   a housing defining an internal volume and an outlet fluidly connectable to an oil system;
   a filter cartridge removably received within the internal volume of the housing; and
   an inlet conduit defining an inlet fluidly connectable to the oil system, the inlet conduit being in fluid flow communication with the internal volume of the housing, the inlet conduit including first and second sections being transverse to one another, the inlet conduit having:
   a wall circumscribing a main flow passage from the inlet to the internal volume, and
   a sedimentation pocket defined by the wall, the sedimentation pocket extending downwardly away from the main flow passage and downwardly from an intersection between the first and second sections, and in a direction having a component parallel to a direction of a gravity when the filter assembly is in use.

2. The filter assembly of claim 1, wherein the first section is secured to the housing, the sedimentation pocket being aligned with the first section.

3. The filter assembly of claim 1, wherein a flow passage area of the inlet conduit increases in a downstream direction from the inlet towards the sedimentation pocket.

4. The filter assembly of claim 3, wherein the flow passage area of the inlet conduit increases in the downstream direction away from the sedimentation pocket and toward the internal volume of the housing.

5. The filter assembly of claim 1, wherein the housing has a bottom wall, a top wall, and a peripheral wall extending along a longitudinal axis from the bottom wall to the top wall, the inlet conduit secured to the bottom wall.

6. The filter assembly of claim 5, wherein about half of the bottom wall is opened to communicate with the inlet conduit.

7. The filter assembly of claim 5, wherein the sedimentation pocket is in register with an aperture defined through the bottom wall.

8. The filter assembly of claim 1, wherein the sedimentation pocket is bounded by a lip, the lip extending into a flow passage area of the inlet conduit from the wall of the inlet conduit.

9. The filter assembly of claim 1, wherein the inlet conduit includes a third section extending from the second section, the third section extending substantially parallel to the first section.

10. The filter assembly of claim 9, wherein a flow passage area of the third section increases from the inlet to an intersection between the third section and the second section.

11. The filter assembly of claim 1, wherein the housing and the inlet conduit are parts of a monolithic single body.

12. A filter assembly, comprising:
a housing defining an internal volume and an outlet fluidly connectable to an oil system;
a filter cartridge removably received within the internal volume of the housing;
an inlet conduit defining an inlet fluidly connectable to the oil system, the inlet conduit being in fluid flow communication with the internal volume of the housing, the inlet conduit having:
a wall circumscribing a main flow passage from the inlet to the internal volume, and
a sedimentation pocket defined by the wall, the sedimentation pocket extending downwardly away from the main flow passage and in a direction having a component parallel to a direction of a gravity when the filter assembly is in use; and
a bypass stemming from the inlet conduit, the bypass fluidly connecting the inlet to the outlet of the filter assembly while bypassing the internal volume, and a bypass valve fluidly connected to the bypass conduit and operable to selectively allow or prevent fluid communication through the bypass.

13. The filter assembly of claim 12, wherein the inlet conduit includes first and second sections being transverse to one another, the sedimentation pocket extending downwardly from an intersection between the first and second sections, the first section secured to the housing, the bypass stemming from the second section.

14. A method of removing particles from an oil flow, comprising:
directing the oil flow towards a filter cartridge via an inlet conduit;
flowing the oil flow past a pocket defined by the inlet conduit thereby allowing a portion of particles in the oil flow to sink by gravity in the sedimentation pocket, including flowing the flow in a first section of the inlet conduit and in a second section of the inlet conduit located downstream of the first section and being transverse to the first section, the sedimentation pocket located at an intersection between the first section and the second section; and
flowing the oil flow through the filter cartridge.

15. The method of claim 14, wherein the directing of the oil flow includes decreasing a speed of the oil flow in the inlet conduit.

16. The method of claim 14, comprising flowing the oil flow in a bypass upon a pressure differential across the filter cartridge exceeding a given threshold.

17. The method of claim 16, wherein the flowing of the oil flow in the bypass comprises flowing the oil flow in the bypass stemming from the inlet conduit upstream of the sedimentation pocket.

18. The method of claim 14, comprising retaining the particles in the sedimentation pocket with a lip extending upwardly from a wall of the inlet conduit.

\* \* \* \* \*